L. A. HAWKINS.
PROTECTIVE DEVICE.
APPLICATION FILED JULY 7, 1914.
1,172,990.
Patented Feb. 22, 1916.
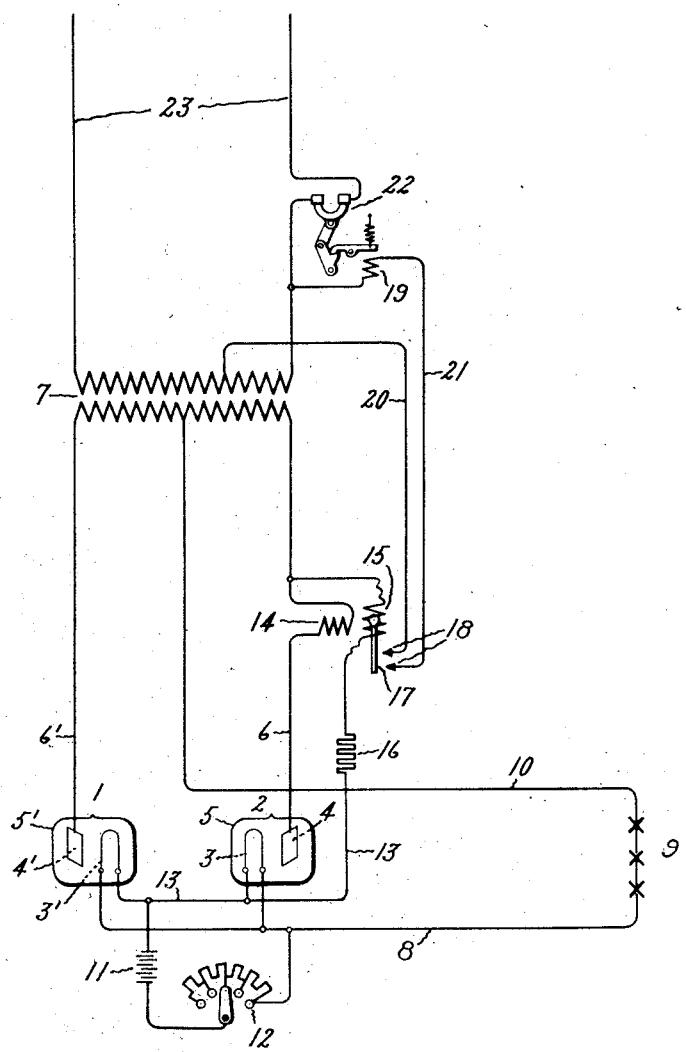
Witnesses:
Anthony Mart.
J. Ellis Glen
Inventor:
Laurence A. Hawkins,
by Albert G. Davis
His Attorney.

UNITED STATES PATENT OFFICE.

LAURENCE A. HAWKINS, OF SCHENECTADY, NEW YORK, ASSIGNOR TO GENERAL ELECTRIC COMPANY, A CORPORATION OF NEW YORK.

PROTECTIVE DEVICE.

1,172,990.

Specification of Letters Patent.

Patented Feb. 22, 1916.

Application filed July 7, 1914. Serial No. 849,539.

*To all whom it may concern:*

Be it known that I, LAURENCE A. HAWKINS, a citizen of the United States, residing at Schenectady, county of Schenectady, State of New York, have invented certain new and useful Improvements in Protective Devices, of which the following is a specification.

My invention relates to the projection against overload of hot-cathode vacuum tubes or other devices having a similar volt-ampere characteristic, and is particularly applicable to hot-cathode rectifiers.

When a hot cathode tube so highly exhausted that its current is a pure electron discharge, is operated as a rectifier, current passes in one direction only, since such a tube has what may be termed "unidirectional conductivity", and that current, furthermore, is substantially constant in amount, regardless of the voltage of the source and the resistance of the load. In practice, such a tube is so designed with reference to the voltage and current required in the load circuit, that in normal operation only a small part of the voltage of the source is consumed in the tube while the current is passing. For instance, assume a load circuit requiring a quarter of an ampere at 40,000 volts. The tube might be so designed to have from 200 to 400 volts drop when the current is passing so that the normal energy in the tube would be from 50 to 100 watts, while the rest of the 10 kilowatts would be consumed in the load circuit. But if while the tube were thus operating, the load circuit should be accidentally short-circuited, the current through the tube would remain practically constant, but the voltage across the tube would rise to 40,000 and the full 10 kilowatts would then be consumed in the tube itself and would quickly destroy the tube. Now ordinary protection devices would not protect the tube under these circumstances. In the first place, since the current remains constant, an excess current device would not operate. Secondly, an excess-voltage device could not be used, since the same 40,000 volts that occurs across the tube when current is flowing on short-circuit, exists in normal operation on every other half cycle while current has ceased to flow because of the unidirectional conductivity of the tube. This high voltage that exists normally while current is not flowing does no harm to the tube since it represents no energy, but it makes impossible the use of an excess-voltage device to protect the tube.

By my invention I utilize, for the protection of the tube, the fact that the dangerous condition involves the existence of the high voltage at the same instant current is flowing, or in other words, of high voltage in phase with the current, and my invention consists in providing a protective device depending for its operation on the coöperation of current and of high voltage in phase therewith.

The accompanying drawing illustrates my invention diagrammatically in a system for rectifying alternating current by means of incandescent cathode devices. The electron discharge devices 1, 2 each comprise a filamentary cathode 3 adapted to be heated and a coöperating anode 4, these electrodes being contained in a sealed envelop 5. The space within the envelop is evacuated to such low pressure, for example, one-tenth of a micron of mercury or less, and the envelop and the electrodes are so completely freed from gas that positive ionization of residual gas by collision is substantially absent as described in an application filed by Irving Langmuir, Serial No. 795,610, filed Oct. 16, 1913. Such devices may be used to carry relatively heavy currents with a voltage drop as low as about 100—200 volts. The voltage of the circuit may be very much greater, for example, one-hundred thousand volts or more, the voltage drop in the rectifier representing only a small fraction of the circuit voltage. The anodes 4, 4' are connected by conductors 6, 6' to the terminals of the secondary of the transformer 7. The cathodes 3, 3' are both connected to a conductor 8 which is connected to the load 9, the circuit being completed by a conductor 10 to a neutral point on the transformer secondary. The cathodes 3, 3' are both heated by a battery 11, connected in series with variable resistance 12 across the conductors 8 and 13, or in any other convenient manner.

The current coil 14 connected in series with the anode conductor 6 and the voltage coil 15 connected respectively to the cathode 3 and the anode 4 of the electron discharge device in series with a very high resistance 16, are respectively the current and voltage coils of a wattmeter type relay. A flow of current coincidently through both coils causes a movement of the pivoted armature 17 in the well-known manner, bridging the contacts 18, and completing the circuit of a circuit breaker controlling magnet 19 connected by conductors 20 and 21 across a section of the primary of the transformer 7, or any other convenient source of current. When a short circuit occurs across any part of the load 9 the voltage across the device 2 will be greater proportionately when the load current is passing than normally when all the load is in circuit, as has been heretofore explained. That is, a short circuit in the load will cause a proportionate increase of voltage in the coil 15 coincident with the passage of current through the coil 14 and will energize the magnet 19 thereby unlatching the circuit breaker 22 and opening the primary circuit 23 of the transformer. Of course, in the same manner a resistance can be inserted in the supply circuit instead of completely opening the circuit. I wish it also to be understood that a similar protective device may be provided for the discharge device 1 but this is not absolutely necessary as the circuit will be opened in any event during the succeeding half wave if the short circuit happens to occur while current is being passed by device 1.

What I claim as new and desire to secure by Letters Patent of the United States, is:—

1. The combination of a source of alternating current, a discharge device having unidirectional conductivity and passing a substantially constant current with a variable impressed voltage, a load connected in series with said device and means responsive to an abnormal increase of energy in said device for deënergizing said device.

2. The combination of a source of alternating current, an electron discharge device having asymmetric conductivity, a load connected in series with said device and means for disconnecting said source in response to an abnormal rise of energy in said discharge device.

3. The combination of a source of current, a device supplied by said source having unidirectional conductivity and transmitting a substantially constant current with a variable voltage, a load connected in series with said device and means for deënergizing said device responsive to an abnormal voltage across the terminals of said device coincidently with a passage of current through said device.

4. The combination of a source of alternating current, a rectifying device operating with a pure electron discharge, a load circuit in series with said device and said source, and circuit controlling means for controlling the energy supply responsive to a passage of current through said rectifying device and increase of voltage in phase therewith across the terminals of said device above a predetermined value.

5. The combination of a source of alternating current, an incandescent cathode device operating with a substantially pure electron discharge, a load circuit fed from said source through said device, and means for deënergizing said device responsive to an increase of energy in said device above a predetermined value.

In witness whereof, I have hereunto set my hand this 6th day of July, 1914.

LAURENCE A. HAWKINS.

Witnesses:
 M. F. BECKETT,
 HELEN ORFORD.